(12) United States Patent
Kats et al.

(10) Patent No.: US 6,448,513 B1
(45) Date of Patent: Sep. 10, 2002

(54) ELECTRONIC WEIGHING APPARATUS UTILIZING SURFACE ACOUSTIC WAVES

(75) Inventors: Vyacheslav D. Kats, East Rockaway; Arnold S. Gordon, Woodmere, both of NY (US)

(73) Assignee: Circuits & Systems Inc., East Rockaway, NY (US)

( * ) Notice: Subject to any disclaimer, the term of this patent is extended or adjusted under 35 U.S.C. 154(b) by 15 days.

(21) Appl. No.: 09/775,748

(22) Filed: Feb. 2, 2001

(51) Int. Cl.⁷ .............................. G01G 3/14; G01G 3/16
(52) U.S. Cl. ........................... 177/210 R; 177/210 FP; 73/580; 73/862.59; 73/DIG. 4; 331/65; 331/47
(58) Field of Search .............................. 73/862.59, 579, 73/580, DIG. 4; 177/210 R, 210 FP; 331/65, 66, 47

(56) References Cited

U.S. PATENT DOCUMENTS

| | | | |
|---|---|---|---|
| 4,096,740 A | 6/1978 | Sallee | 73/88.5 |
| 4,107,626 A | 8/1978 | Kiewit | 177/210 FP |
| 4,294,321 A | 10/1981 | Wittlinger et al. | 177/210 |
| 4,361,026 A | * 11/1982 | Muller et al. | 331/65 |
| 4,623,813 A | 11/1986 | Naito et al. | 177/210 FP |
| 4,858,145 A | 8/1989 | Inoue et al. | 177/210 FP |
| 4,957,177 A | 9/1990 | Hamilton et al. | 177/211 |
| 5,476,002 A | 12/1995 | Bowers et al. | 73/24.01 |
| 5,663,531 A | 9/1997 | Kats | 177/210 FP |
| 5,910,647 A | 6/1999 | Kats et al. | 177/210 FP |
| 6,211,473 B1 | 4/2001 | Kats et al. | 177/210 R |

OTHER PUBLICATIONS

"Progress in the development of SAW resonator pressure transducers" by Cullen et al., 1980 Ultrasonics Symposium, pp. 696–701.

"Pressure and acceleration sensitivity of SAW Interferometer" by Staples et al., 1981 Ultrasonics Symposium, pp. 155–158.

"Displacement Measurement by SAW Delay–Line Oscillator Consisting of Two $LiNbO_3$ Plates with IDT" by Ishido et al, 1987 IEEE, pp. 83–86.

"A 200 MHz surface acoustic wave resonator mass microbalance" by Bowers et al., Jun. 1991, Review of Scientific Instruments, pp. 1624–1629.

* cited by examiner

Primary Examiner—Randy W. Gibson
(74) Attorney, Agent, or Firm—David P. Gordon; David S. Jacobson; Thomas A Gallagher

(57) ABSTRACT

A weighing apparatus includes a SAW oscillator and a "push oscillator" to force the SAW oscillator into a desired mode of operation. A SAW temperature oscillator and a thermistor are also provided. The frequency of the "push oscillator" is made immune to temperature changes by generating it via a mixer mixing the SAW temperature oscillator with an adjustable fixed frequency oscillator. Long term stability of the SAW temperature oscillator is achieved by periodic calibration with the thermistor.

24 Claims, 4 Drawing Sheets

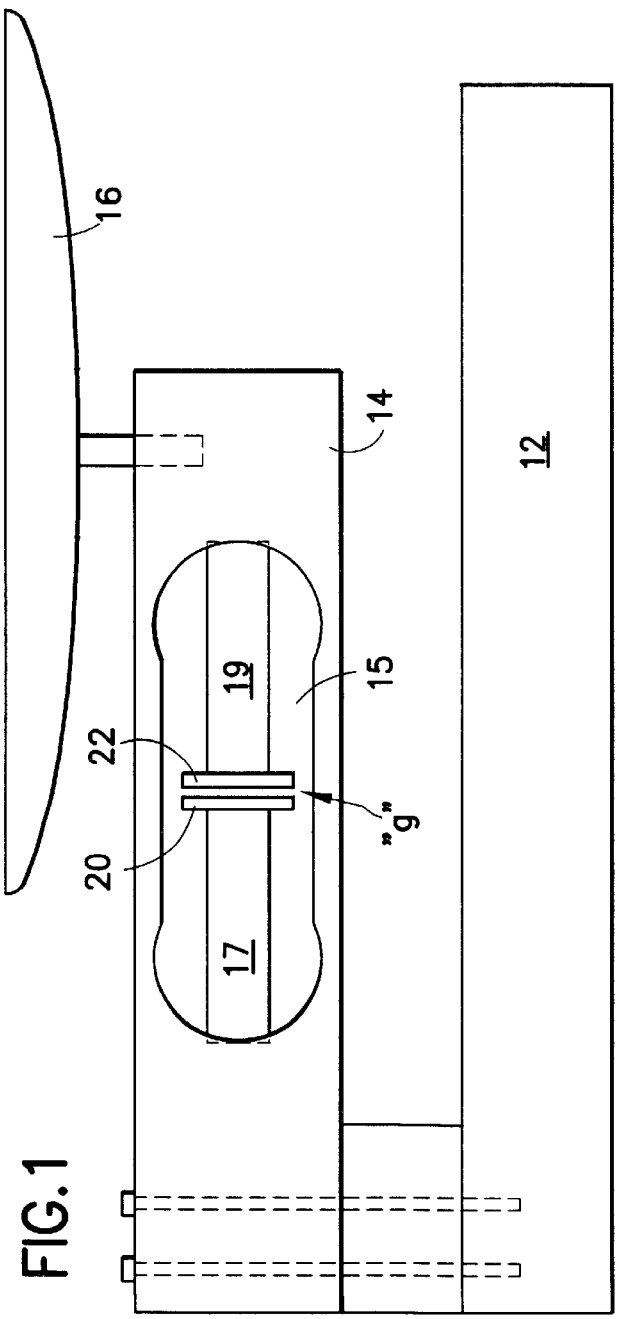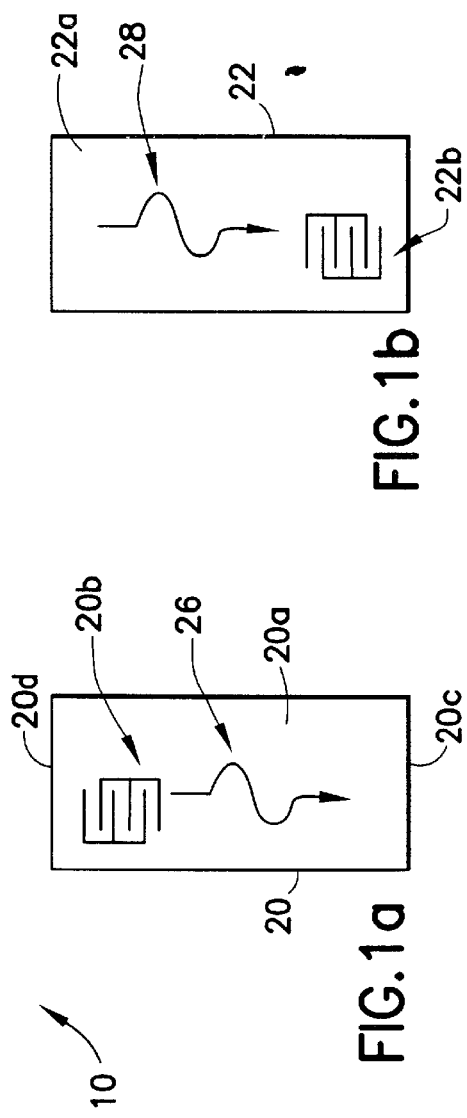

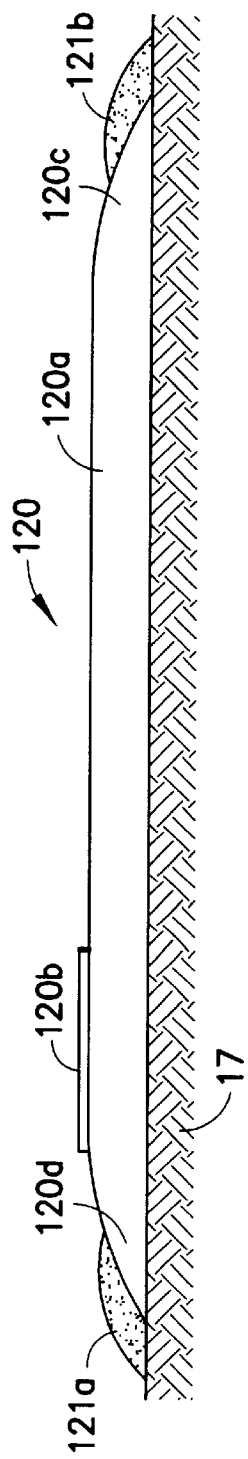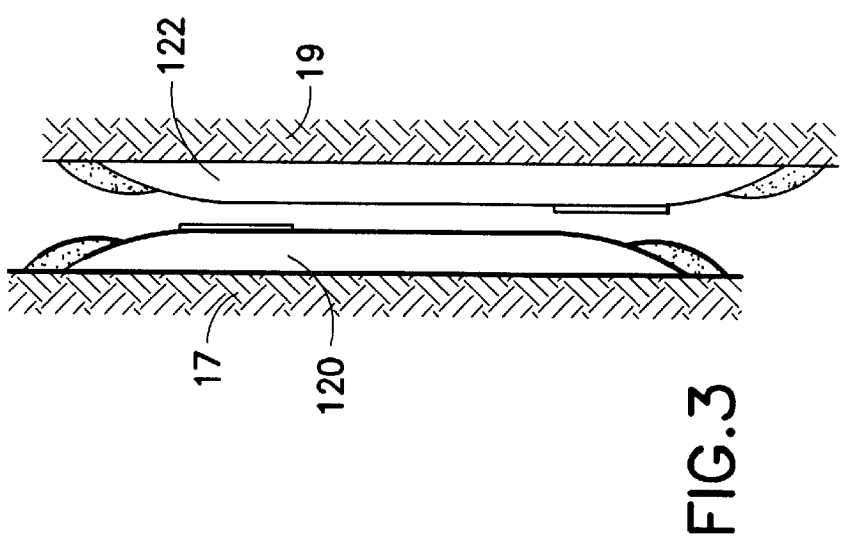

ELECTRONIC WEIGHING APPARATUS UTILIZING SURFACE ACOUSTIC WAVES

This application is related to allowed co-owned application Ser. No. 09/327,707 filed Jun. 9, 1999 now U.S. Pat. No. 6,211,473, Ser. No. 08/729,752 filed Oct. 7, 1996, now U.S. Pat. No. 5,910,647, and Ser. No. 08/489,365 filed Jun. 12, 1995, now U.S. Pat. No. 5,663,531, the complete disclosures of which are hereby incorporated by reference herein.

BACKGROUND OF THE INVENTION

1. Field of the Invention

The invention relates to electronic weighing devices. More particularly, the invention relates to an electronic weighing device which employs surface acoustic waves to measure weight.

2. State of the Art

Precision electronic weighing devices are widely known in the art and there are many different technologies utilized in these electronic weighing devices. Laboratory scales or "balances" typically have a capacity of about 1,200 grams and a resolution of about 0.1 gram, although scales with the same resolution and a range of 30,000 grams are available. The accuracy of these scales is achieved through the use of a technology known as magnetic force restoration. Generally, magnetic force restoration involves the use of an electromagnet to oppose the weight on the scale platform. The greater the weight on the platform, the greater the electrical current needed to maintain the weight. While these scales are very accurate (up to one part in 120,000), they are expensive and very sensitive to ambient temperature. In addition, their range is relatively limited.

Most all other electronic weighing devices use load cell technology. In load cell scales, the applied weight bends an elastic member which has strain gauges bonded to its surface. The strain gauge is a fine wire which undergoes a change in electrical resistance when it is either stretched or compressed. A measurement of this change in resistance yields a measure of the applied weight. Load cell scales are used in non-critical weighing operations and usually have a resolution of about one part in 3,000. The maximum resolution available in a load cell scale is about one part in 10,000 which is insufficient for many critical weighing operations. However, load cell scales can have a capacity of several thousand pounds.

While there have been many improvements in electronic weighing apparatus, there remains a current need for electronic weighing apparatus which have enhanced accuracy, expanded range, and low cost.

The previously incorporated applications disclose an electronic weighing apparatus having a base which supports a cantilevered elastic member upon which a load platform is mounted. The free end of the elastic member is provided with a first piezoelectric transducer and a second piezoelectric transducer is supported by the base. Each transducer includes a substantially rectangular piezoelectric substrate and a pair of electrodes imprinted on the substrate at one end thereof, with one pair of electrodes acting as a transmitter and the other pair of electrodes acting as a receiver. The transducers are arranged with their substrates substantially parallel to each other with a small gap between them and with their respective electrodes in relatively opposite positions. The receiver electrodes of the second transducer are coupled to the input of an amplifier and the output of the amplifier is coupled to the transmitter electrodes of the first transducer. The transducers form a "delay line" and the resulting circuit of the delay line and the amplifier is a positive feedback loop, i.e. a natural oscillator. More particularly, the output of the amplifier causes the first transducer to emit a surface acoustic wave ("SAW") which propagates along the surface of the first transducer substrate away from its electrodes. The propagating waves in the first transducer induce an oscillating electric field in the substrate which in turn induces similar SAW waves on the surface of the second transducer substrate which propagate in the same direction along the surface of the second transducer substrate toward the electrodes of the second transducer. The induced waves in the second transducer cause it to produce an alternating voltage which is supplied by the electrodes of the second transducer to the amplifier input. The circuit acts as a natural oscillator, with the output of the amplifier having a particular frequency which depends on the physical characteristics of the transducers and their distance from each other, as well as the distance between the respective electrodes of the transducers.

When a load is applied to the load platform, the free end of the cantilevered elastic member moves and causes the first transducer to move relative to the second transducer. The movement of the first transducer relative to the second transducer causes a change in the frequency at the output of the amplifier. The movement of the elastic member is proportional to the weight of the applied load and the frequency and/or change in frequency at the output of the amplifier can be calibrated to the displacement of the elastic member. The frequency response of the delay line is represented by a series of lobes. Each mode of oscillation is defined as a frequency where the sum of the phases in the oscillator is an integer multiple of $2\pi$. Thus, as the frequency of the oscillator changes, the modes of oscillation move through the frequency response curve and are separated from each other by a phase shift of $2\pi$. The mode at which the oscillator will most naturally oscillate is the one having the least loss. The transducers are arranged such that their displacement over the weight range of the weighing apparatus causes the oscillator to oscillate in more than one mode. Therefore, the change in frequency of the oscillator as plotted against displacement of the transducers is a periodic function. There are several different ways of determining the cycle of the periodic function so that the exact displacement of the elastic member may be determined.

It is generally known in the art of SAW technology that the frequency range in which the losses are the lowest is not necessarily the frequency range in which the oscillator exhibits the best phase linearity. From the teachings of the previously incorporated applications, those skilled in the art will appreciate that in a SAW displacement transducer such as disclosed in the previously incorporated applications, better phase linearity provides a more linear relationship between frequency and displacement. In the case of a weighing apparatus using a SAW displacement transducer as described in the previously incorporated applications, better phase linearity will result in a more linear relationship between weight and frequency.

It is known in the art of SAW oscillators that changing the topology of the oscillator transmitter and receiver can cause a broader bandwidth of the delay line and that a broader bandwidth results in better phase-linearity. It is also known that using a smaller frequency range provides better linearity and that a smaller frequency range can be obtained with a longer delay line. Although these known methods can increase phase linearity in a SAW oscillator, the frequency range in which the best linearity is achieved for a particular oscillator is still not necessarily the range with the lowest losses.

From the foregoing, those skilled in the art will appreciate that in order to enhance the accuracy of a SAW displacement transducer such as that used in a weighing device, it would be desirable to cause the SAW oscillator to oscillate in the range having the best phase linearity.

As disclosed in the previously incorporated applications, weighing accuracy is affected by temperature. The previously incorporated applications disclose a SAW temperature oscillator having a transmitter and receiver on the same substrate. The temperature sensitivity of the load cell disclosed in the previously incorporated applications is approximately 500 ppm of the weight reading per 1° C. temperature change. Accuracy of 100 ppm of the weight reading can be achieved if temperature is measured to within 0.2° C. which represents a shift of about 1 kHz of the SAW temperature sensor. This shift is easy to measure in the short term. The resolution of the SAW temperature sensor is on the order of 0.001° C. However, the long term stability of the SAW temperature sensor can drift more than 1 kHz due to many factors including humidity.

It will also be appreciated that temperature changes can make determination of mode of oscillation more difficult. In the previously incorporated applications, mode determination was determined by switching the phase ±π and noting the frequency change. However, factors such as temperature and non-linearity can make the frequency change very small thereby making the mode determination unreliable.

SUMMARY OF THE INVENTION

It is therefore an object of the invention to provide an electronic weighing apparatus which is accurate.

It is also an object of the invention to provide an electronic weighing apparatus which uses surface acoustic waves and is accurate over a broad range of weights.

It is another object of the invention to provide an electronic weighing apparatus which is compact and easy to construct.

It is a further object of the invention to provide an electronic weighing apparatus which is inexpensive to manufacture.

It is another object of the invention to provide an electronic weighing apparatus which utilizes surface acoustic waves and which has enhanced phase linearity.

It is still another object of the invention to provide an electronic weighing apparatus which utilizes surface acoustic waves and which is oscillates in the mode of best phase linearity.

It is yet another object of the invention to provide an electronic weighing apparatus which utilizes surface acoustic waves and has long term temperature stability as well as short term temperature stability.

In accord with these objects which will be discussed in detail below, the improved weighing apparatus of the present invention includes a base which supports a cantilevered elastic member upon which a load platform is mounted. The interior of the elastic member is hollowed and is provided with first and second piezoelectric transducers which are mounted on respective opposed posts. Each transducer includes a substantially rectangular piezoelectric substrate and a pair of electrodes imprinted on the substrate at one end thereof, with one pair of electrodes acting as a transmitter and the other pair of electrodes acting as a receiver. The transducers are arranged with their substrates substantially parallel to each other with a small gap between them and with their respective electrodes in relatively opposite positions. The receiver electrodes of the second transducer are coupled to the input of an amplifier and the output of the amplifier is coupled to the transmitter electrodes of the first transducer. The transducers form a "delay line" and the resulting circuit of the delay line and the amplifier is a positive feedback loop, i.e. a natural oscillator. More particularly, the output of the amplifier causes the first transducer to emit a surface acoustic wave ("SAW") which propagates along the surface of the first transducer substrate away from its electrodes. The propagating waves in the first transducer induce an oscillating electric field in the substrate which in turn induces similar SAW waves on the surface of the second transducer substrate which propagate in the same direction along the surface of the second transducer substrate toward the electrodes of the second transducer. The induced waves in the second transducer cause it to produce an alternating voltage which is supplied by the electrodes of the second transducer to the amplifier input. The circuit acts as a natural oscillator, with the output of the amplifier having a particular frequency which depends on the physical characteristics of the transducers and their distance from each other, as well as the distance between the respective electrodes of the transducers.

According to the invention, when a load is applied to the load platform, the cantilevered elastic member bends and causes the first transducer to move relative to the second transducer. The movement of the first transducer relative to the second transducer causes a change in the frequency at the output of the amplifier. The bending movement of the elastic member is proportional to the weight of the applied load and the frequency and/or change in frequency at the output of the amplifier can be calibrated to the displacement of the elastic member.

According to one aspect of the invention, a "push oscillator" is coupled to the delay line for injecting a strong RF signal at a frequency in the middle of the oscillation mode which exhibits the best phase linearity. The frequency of the "push oscillator" is determined experimentally when the scale is calibrated. The RF signal is injected periodically in short bursts.

According to a second aspect of the invention, the "push oscillator" frequency is generated by mixing the temperature oscillator with an adjustable fixed frequency oscillator. This immunizes the "push oscillator" from the affects of temperature.

According to a third aspect of the invention, a thermistor is provided for long term temperature stability. The SAW temperature sensor is periodically calibrated to the thermistor.

According to a fourth aspect of the invention, the SAW oscillators are not hermetically sealed and the SAW temperature sensor is used to correct the displacement sensor for changes in humidity.

Additional objects and advantages of the invention will become apparent to those skilled in the art upon reference to the detailed description taken in conjunction with the provided figures.

BRIEF DESCRIPTION OF THE DRAWINGS

FIG. 1 is a schematic side elevation view of an exemplary embodiment of the invention;

FIG. 1a is an enlarged schematic plan view of a first transducer;

FIG. 1b is an enlarged schematic plan view of a second transducer;

FIG. 2 is an enlarged schematic side elevation view of a transducer having anti-reflection structure according to the invention;

FIG. 3 is an enlarged schematic side elevation view of a pair of transducers according to the invention;

DETAILED DESCRIPTION OF THE PREFERRED EMBODIMENTS

Figure 4:
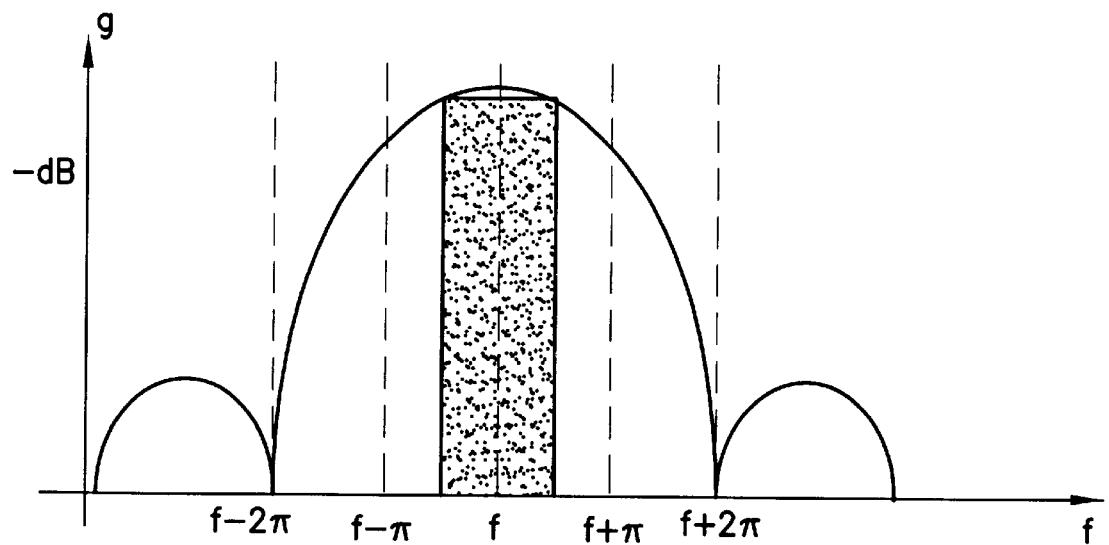
FIGS. 4 and 5 are graphs of a portion of a frequency response curve for a delay line according to the invention showing modes of oscillation and phase shifting according to the invention.

Referring now to FIGS. 1, 1a, and 1b, an electronic weighing apparatus 10 according to the invention includes a base 12 which supports a cantilevered elastic member 14 having a cut-out 15, and upon which a load platform 16 is mounted. The cut-out 15 is provided with two opposed posts 17, 19 upon which are respectively mounted a first piezoelectric transducer 20 and a second piezoelectric transducer 22. The posts 17, 19 serve to locate the transducers 20, 22 at the center of the elastic member 14 and to mechanically couple the transducers to opposite ends of the elastic member 14.

The first transducer 20 includes a substantially rectangular piezoelectric substrate 20a and a pair of electrodes 20b imprinted on the substrate at the upper end thereof. The second transducer 22 includes a substantially rectangular piezoelectric substrate 22a and a pair of electrodes 22b imprinted on the substrate at the lower end thereof. The substrates are preferably made of Lithium Niobate. The transducers are arranged with their substrates substantially parallel to each other with a small gap "g" between them. The electrodes 22b of the second transducer 22 are coupled to the input of an amplifier (not shown) powered by a power source (not shown) and the output of the amplifier is coupled to the electrodes 20b of the first transducer 20. The circuit arrangement is the same as shown in the previously incorporated application Ser. No. 08/489,365, previously incorporated herein by reference. The resulting circuit is a positive feedback loop natural oscillator, a "delay line". The output of the amplifier generates an alternating voltage in the electrodes 20b of the first transducer 20 which generates a surface acoustic wave ("SAW") 26 which propagates along the surface of the first transducer substrate 20a away from its electrodes 20b. Since the substrate 20a of the first transducer 20 is relatively close to the substrate 22a of the second transducer 22, an oscillating electric field which is induced as a result of the SAW waves 26 in the piezoelectric substrate 20a is able to in turn induce similar SAW waves 28 on the surface of the second transducer substrate 22a which propagate in the same direction along the surface of the second transducer substrate toward the electrodes 22b of the second transducer 22. The induced waves 28 in the second transducer 22 cause the electrode 22b of the second transducer 22 to produce an alternating voltage which is provided to the input of the amplifier. As long as the gain of the amplifier 24 is larger than the loss of the system, the circuit acts as a natural oscillator with the output of the amplifier having a particular frequency which depends on the physical characteristics of the transducers and their distance from each other, as well as the distance between the respective electrodes of the transducers. In particular, the frequency of the oscillator is directly related to the time it takes for the SAW to propagate from the electrodes 20b to the electrodes 22b.

According to presently preferred embodiments of the invention, described in more detail below, the SAW 26 has a wavelength of approximately 100–200 microns at 20–50 MHz. In order to limit loss in the system, the gap "g" between the substrates of the first and second transducers is kept small. In one preferred embodiment described below, the gap is 10–20 microns. With such a gap, an oscillating system can typically be generated if the amplifier 24 has a gain of at least approximately 25 dB. It will be appreciated that when a load (not shown) is applied to the load platform 16, the free end of the cantilevered elastic member 14 moves down and causes the second transducer 22 to move relative to the first transducer 20. In particular, it causes the electrodes 22b of the second transducer 22 to move away from the electrodes 20b of the first transducer 20. This results in a lengthening of the "delay line". The lengthening of the delay line causes an decrease in the frequency at the output of the amplifier. The displacement of the elastic member is proportional to the weight of the applied load and the frequency or decrease in frequency at the output of the amplifier can be calibrated to the distance moved by the elastic member.

It will be appreciated that locating the transducers at the center of the elastic member compensates for any torque on the member which would exhibit itself at the free end of the member. This results in an improved accuracy as compared to the weighing instrument disclosed in U.S. Pat. No. 5,663,531. Depending on the application (e.g. maximum load to be weighed), the elastic member is made of aluminum or steel. The presently preferred elastic member exhibits a maximum displacement of 0.1 to 0.2 mm at maximum load.

Reflected waves may occur on both piezo substrates. Reflected waves interfere with the received signal. The interference causes an increase in non-linearity. FIGS. 2 and 3 show presently preferred anti-reflection structures according to the invention.

Turning now to FIGS. 2 and 3, presently preferred transducers 120, 122 are shown. FIG. 2 illustrates the features of transducer 120 which is substantially identical to transducer 122. FIG. 3 illustrates the transducers mounted on the posts 17, 19 of the elastic member 14 of FIG. 1. As shown in FIG. 2, the transducer 120 includes a lithium niobate substrate 120a with electrodes 120b imprinted thereon. The ends 120c, 120d of the substrate are tapered and polyurethane dampers 121a, 121b are placed at the ends to minimize reflection of the SAW waves.

Figure 5:
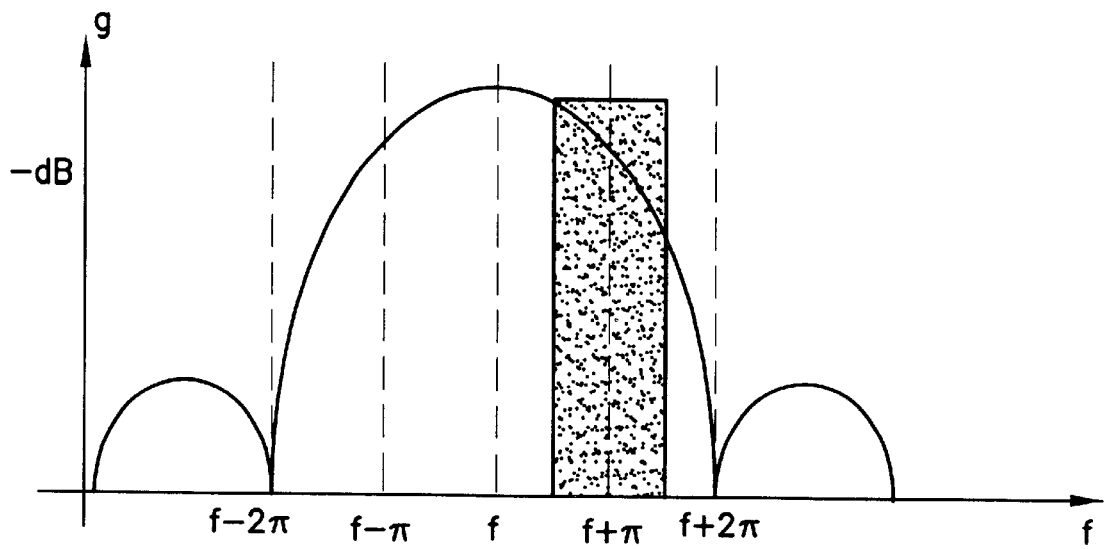

As mentioned above and in the previously incorporated application, the delay lines according to the invention may oscillate in more than one mode and within each mode, the gain will vary as the frequency changes. Referring now to FIGS. 4 and 5, in the idle state, with no weight applied to the scale, the delay line will oscillate at a frequency "f" which is shown in FIG. 4 as the point having the most gain (least loss). The optimal gain area of the graph of FIG. 4 is shown in the shaded area surrounding f and represents a range of ±100 Khz, for example. This area is considered optimal because it is the area of least loss. However, it is not necessarily the area of best phase linearity. After experimenting, it may be discovered that oscillation in a different mode, e.g. the shaded area of FIG. 5, will produce better phase linearity. According to one aspect of the invention, the oscillator is forced to oscillate in the mode of best phase linearity by injecting a strong RF signal having a frequency at the midpoint of the desired mode of oscillation. The RF signal is injected by a "push oscillator" coupled to the SAW wave receiver as described in more detail below with reference to FIG. 6. According to the presently preferred embodiment, the RF signal has a strength of approximately 100 mv as compared to the SAW oscillator's strength of approximately 10 mv. The RF signal is preferably injected for a short time (as short as 0.01 seconds) before each weight measurement.

As mentioned above, and described in detail in the previously incorporated applications, the effects of temperature can be further corrected by providing a separate SAW temperature sensor on the same substrate as one of the displacement transducers. According to the presently preferred embodiment, the SAW displacement oscillator operates at 55 MHz and the SAW temperature oscillator operates at 57 MHz. According to another aspect of the invention, described in more detail below with reference to FIG. 6, the temperature oscillator is used in conjunction with an adjustable 2 MHz oscillator and a mixer to produce the "push oscillator" frequency and automatically adjust the "push oscillator" frequency for temperature changes.

Figure 6:
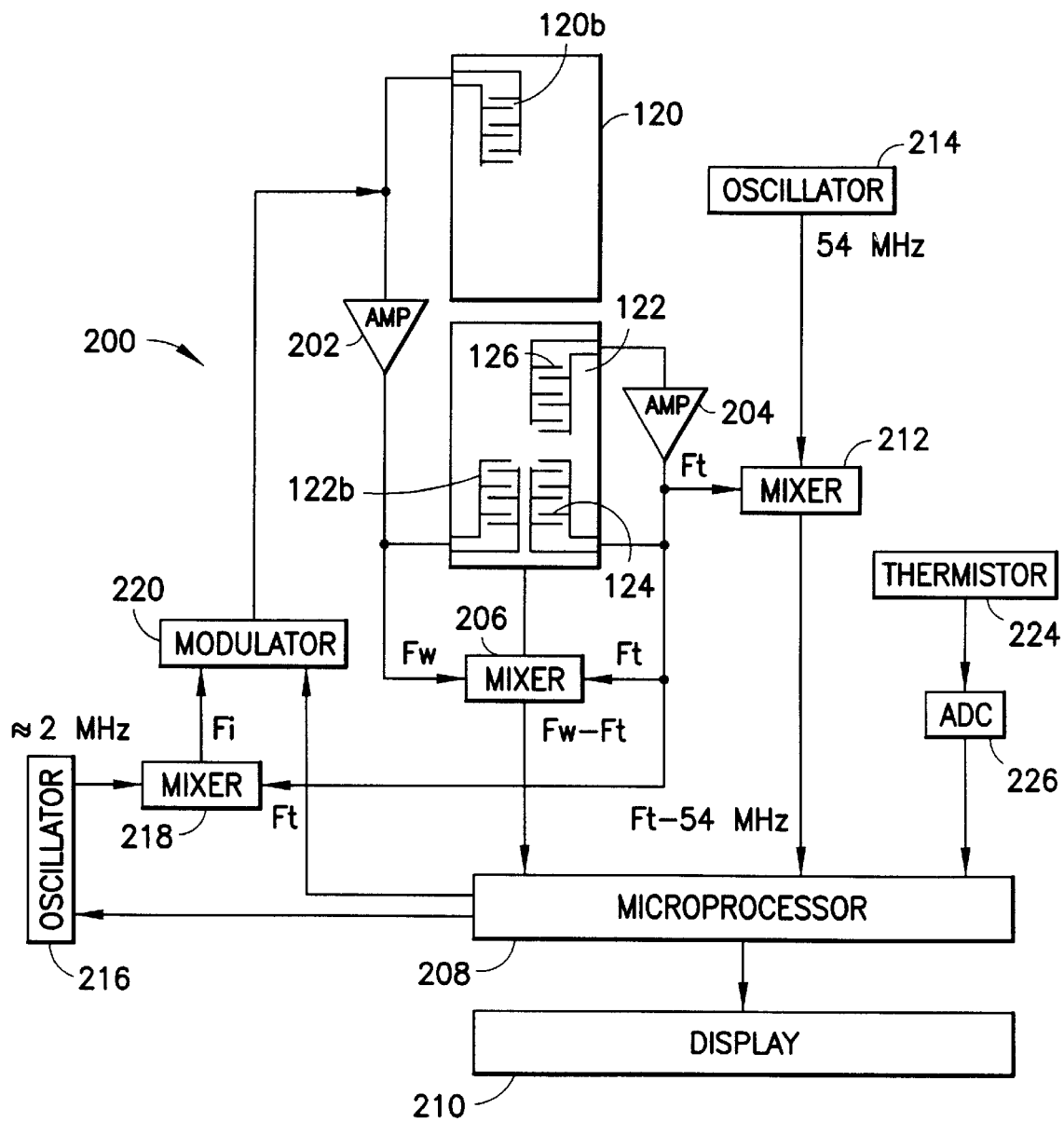
FIG. 6 is a simplified schematic diagram of circuits used in the weighing device according to the invention.

Turning now to FIG. 6, an exemplary circuit 200 according to the invention includes the displacement SAW transducer formed by the transmitter 122b on the substrate 122 and the receiver 120b on the substrate 120 coupled to each other by the amplifier 202. In addition, the circuit includes a temperature SAW transducer formed by the transmitter 124 and receiver 126 on the substrate 122 coupled to each other by the amplifier 204. The output of amplifier 202 is a frequency Fw which varies according to displacement of the substrates relative to each other, which is an indication of weight when the transducers are arranged as shown in FIG. 1. According to the presently preferred embodiment, the frequency Fw is nominally 54 MHz. Fw will also vary according to temperature. The output of amplifier 204 is a frequency Ft which varies only according to temperature and humidity and which is nominally 57 MHz. The frequencies Fw and Ft are mixed (subtracted) at the mixer 206 to produce a nominal frequency of 3 MHz which varies according to weight and which is temperature compensated. The output frequency of the mixer 206 is input to a microprocessor 208 which calculates weight as described in the previously incorporated applications and displays the weight on display 210. According to the presently preferred embodiment, the output Ft of amplifier 204 is also mixed via mixer 212 with a 54 MHz signal from oscillator 214 to produce a signal which is nominally 3 MHz and which varies only with temperature and humidity. The signal Fw-Ft provides a temperature adjusted weight signal which accounts for the affects of temperature on the SAW oscillators. It does not compensate for temperature effects on the Youngs modulus of the elastic member (14 in FIG. 1). The signal output from mixer 212 is a pure temperature indicator and is used to adjust the weight calculation for the effects of temperature on the Youngs modulus of the elastic member.

According to one aspect of the present invention, a "push oscillator" is formed from an adjustable oscillator 216, a mixer 218, and a modulator 220. The oscillator 216 has a nominal frequency of 2 MHz which is mixed via the mixer 218 with the output of amplifier 204 to produce an output frequency Fi which is (Ft—approx. 2 MHz). This frequency Fi is used to index the modulator 220 which produces the "push oscillator" output to the input of amplifier 202. As shown in FIG. 6, the modulator 220 and the oscillator 216 are both coupled to the microprocessor 208. The microprocessor 208 is programmed to periodically activate the modulator 220 to inject the push frequency as described above. In addition, the microprocessor advantageously is utilized to adjust the oscillator 216 to determine the frequency of the "push oscillator". The oscillator 216 may be initially adjusted via a simple variable resistor or variable capacitor. However, it is further adjusted by the microprocessor during operation of the scale. One of these advantages is that the microprocessor can adjust the oscillator 216 to produce the phase shifting described in the previously incorporated applications. In addition, it can be used to produce much larger frequency shifts than were possible in the previously incorporated applications. This results in more accurate determinations of which weight range the scale is in. As described in the previously incorporated applications, the oscillator operated as a periodic function where the same frequencies were repeated over different weight ranges. A phase shift of $\pm\pi$ was used to determine which weight range the scale was operating in. As the weight increased, the same phase shift produced a larger frequency shift (because of the increased length of the delay line) and the frequency shift could be used to determine the weight range. However, under some circumstances, the phase shift resulted in a frequency shift which was too small to accurately determine. The push oscillator of the present invention can be used to produce $\pm 4\pi$ phase shifts.

As mentioned above, the oscillator 216 is preferably initially adjusted with a variable resistor or variable capacitor to ensure oscillation on the mode of best phase linearity. Initial calibration is performed as follows: Known weights are placed on the scale and the frequency of the oscillator output is determined for different weights and the modes of oscillation are noted. The push oscillator is tuned to operate in one mode and experiments are conducted to measure linearity. The experiments are repeated for each mode. The push oscillator is then tuned to push to the mode of best linearity.

According to another aspect of the invention, a thermistor 224 is coupled via an analog to digital converter 226 to the microprocessor 208. The thermistor is used to provide long term calibration of the SAW temperature transducer. At first calibration measurements are taken from both the SAW temperature sensor and the thermistor assuming that the true temperature is the thermistor reading. Measurements are taken over a range of 20 or 40° C. and the slope of the SAW temperature sensor output is calculated in Hz/° C. This slope is nominally approximately 5,000 Hz/° C. using an oscillator having a 57 MHz central frequency. Periodically, this calibration is repeated to account for the long term instability of the SAW temperature sensor.

Although one of the earlier applications proposed hermetically sealing sensors, it has been determined that the effects of humidity are accurately accounted for with the SAW temperature sensor. Therefore, it has been determined to be desirable to expose both the displacement transducer and the temperature transducer to the temperature and humidity of the ambient atmosphere.

There have been described and illustrated herein several embodiments of an electronic weighing apparatus utilizing surface acoustic waves. While particular embodiments of the invention have been described, it is not intended that the invention be limited thereto, as it is intended that the invention be as broad in scope as the art will allow and that the specification be read likewise. Thus, while particular frequencies have been disclosed, it will be appreciated that other frequencies could be utilized. Moreover, while particular configurations have been disclosed in reference to the location of transmitting and receiving electrodes, it will be appreciated that the respective locations of transmitters and receivers could be reversed. Furthermore, while several different aspects of the invention have been disclosed as solving various problems, it will be understood that the different aspects of the invention may be used alone or in combination with each other in configurations other than those shown. It will therefore be appreciated by those skilled in the art that yet other modifications could be made to the provided invention without deviating from its spirit and scope as so claimed.

What is claimed is:

1. An electronic weighing apparatus, comprising:
   a) a displaceable elastic member means for receiving a load and being displaced by the load such that the displacement of said elastic member means is related to the weight of the load;
   b) a first piezoelectric transducer having a first substrate and one of a first surface acoustic wave (SAW) transmitter and a first SAW receiver, said first piezoelectric transducer being coupled to said elastic member;
   c) a second piezoelectric transducer having a second substrate and the other of said first SAW transmitter and said first SAW receiver, said second piezoelectric transducer being mounted in close proximity to said first piezoelectric transducer such that said displacement of said elastic member causes a corresponding displacement of one of said first and second piezoelectric transducers relative to each other;
   d) a first amplifier having an input and an output, said input of said first amplifier being coupled to said first SAW receiver and said output of said first amplifier being coupled to said first SAW transmitter such that said first piezoelectric transducer, said first amplifier, and said second piezoelectric transducer form a first oscillator having a first output frequency;
   e) processor means coupled to said output of said first amplifier; and
   f) a push oscillator coupled to said first SAW receiver for altering said first output frequency, wherein
      displacement of said elastic member means causes a displacement of one of said first and second piezoelectric transducers relative to each other and thereby changes said first output frequency, and said first output frequency is used by said processor means to determine an indication of the weight of the load.

2. An electronic weighing apparatus according to claim 1, further comprising:
   g) switching means for periodically activating said push oscillator.

3. An electronic weighing apparatus according to claim 1, further comprising:
   g) a second SAW receiver on one of said first and second substrates;
   h) a second SAW transmitter on the same substrate as the second SAW receiver;
   i) a second amplifier having an input and an output, said input of said second amplifier being coupled to said second SAW receiver and said output of said second amplifier being coupled to said second SAW transmitter, said second SAW amplifier output being indicative of temperature.

4. An electronic weighing apparatus according to claim 3, further comprising:
   j) an adjustable oscillator having an output;
   k) a mixer having a first input, a second input, and an output, said first input being coupled to said output of said adjustable oscillator, said second input being coupled to said output of said second SAW amplifier, wherein
      said output of said mixer provides an index frequency for said push oscillator.

5. An electronic weighing apparatus according to claim 3, wherein:
   said push oscillator includes,
      i) an adjustable oscillator having an output,
      ii) a mixer having a first input, a second input, and an output, said first input being coupled to said output of said adjustable oscillator, said second input being coupled to said output of said second SAW amplifier, and
      iii) a modulator having an input and an input, said input of said modulator being coupled to said mixer and said output of said modulator being the output of said push oscillator.

6. An electronic weighing apparatus according to claim 3, further comprising:
   j) a thermistor having an output indicative of temperature; and
   k) comparison means coupled to said thermistor and said second SAW amplifier for comparing the temperature indication of said thermistor with the temperature indication of said second SAW amplifier.

7. An electronic apparatus for measuring displacement, comprising:
   a) a first piezoelectric transducer having a first substrate and one of a first surface acoustic wave (SAW) transmitter and a first SAW receiver;
   b) a second piezoelectric transducer having a second substrate and the other of said first SAW transmitter and said first SAW receiver, said second piezoelectric transducer being mounted in close proximity to said first piezoelectric transducer;
   c) a first amplifier having an input and an output, said input of said first amplifier being coupled to said first SAW receiver and said output of said first amplifier being coupled to said first SAW transmitter such that said first piezoelectric transducer, said first amplifier, and said second piezoelectric transducer form a first oscillator having a first output frequency;
   d) processor means coupled to said output of said first amplifier; and
   e) a push oscillator coupled to said first SAW receiver for altering said first output frequency, wherein
      displacement of one of said first and second piezoelectric transducers relative to each other and thereby changes said first output frequency, and said first output frequency is used by said processor means to determine an indication of the magnitude of the displacement.

8. An electronic apparatus according to claim 7, further comprising:
   f) switching means for periodically activating said push oscillator.

9. An electronic weighing apparatus according to claim 7, further comprising:
   f) a second SAW receiver on one of said first and second substrates;
   g) a second SAW transmitter on the same substrate as the second SAW receiver;
   h) a second amplifier having an input and an output, said input of said second amplifier being coupled to said second SAW receiver and said output of said second amplifier being coupled to said second SAW transmitter, said second SAW amplifier output being indicative of temperature.

10. An electronic apparatus according to claim 9, further comprising:
  i) an adjustable oscillator having an output;
  j) a mixer having a first input, a second input, and an output, said first input being coupled to said output of said adjustable oscillator, said second input being coupled to said output of said second SAW amplifier, wherein
  said output of said mixer provides an index frequency for said push oscillator.

11. An electronic apparatus according to claim 9, wherein:
said push oscillator includes,
  i) an adjustable oscillator having an output,
  ii) a mixer having a first input, a second input, and an output, said first input being coupled to said output of said adjustable oscillator, said second input being coupled to said output of said second SAW amplifier, and
  iii) a modulator having an input and an input, said input of said modulator being coupled to said mixer and said output of said modulator being the output of said push oscillator.

12. An electronic weighing apparatus according to claim 9, further comprising:
  i) a thermistor having an output indicative of temperature; and
  j) comparison means coupled to said thermistor and said second SAW amplifier for comparing the temperature indication of said thermistor with the temperature indication of said second SAW amplifier.

13. A method for improving the phase linearity of a SAW wave oscillator in an electronic weighing apparatus having a first amplifier having an input coupled to a first SAW receiver and an output coupled to a first SAW transmitter, said method comprising:
  periodically injecting an RF signal into the first SAW receiver in order to change the mode of oscillation to the mode having the best phase linearity.

14. A method according to claim 13, wherein:
  the RF signal is approximately ten times stronger than the signal produced by the first amplifier.

15. A method according to claim 13, wherein:
  the RF signal is injected for approximately 0.01 second every time a weight measurement is made.

16. A method according to claim 13, wherein the weighing apparatus has a second amplifier having an input coupled to a second SAW receiver and an output coupled to a second SAW transmitter with the output of the second amplifier being indicative of temperature, said method further comprising:
  generating the RF signal by mixing the output of the second amplifier with the output of a tunable oscillator.

17. A method according to claim 16, further comprising:
  calibrating the RF signal by tuning the tunable oscillator.

18. A method according to claim 16, further comprising:
  calibrating the output of the second amplifier to the output of a thermistor.

19. A method for improving the phase linearity of a SAW wave oscillator in an electronic apparatus for measuring displacement having a first amplifier having an input coupled to a first SAW receiver and an output coupled to a first SAW transmitter, said method comprising:
  periodically injecting an RF signal into the first SAW receiver in order to change the mode of oscillation to the mode having the best phase linearity.

20. A method according to claim 19, wherein:
  the RF signal is approximately ten times stronger than the signal produced by the first amplifier.

21. A method according to claim 20, wherein:
  the RF signal is injected briefly every time a weight measurement is made.

22. A method according to claim 19, wherein the apparatus has a second amplifier having an input coupled to a second SAW receiver and an output coupled to a second SAW transmitter with the output of the second amplifier being indicative of temperature, said method further comprising:
  generating the RF signal by mixing the output of the second amplifier with the output of a tunable oscillator.

23. A method according to claim 22, further comprising:
  calibrating the RF signal by tuning the tunable oscillator.

24. A method according to claim 22, further comprising:
  calibrating the output of the second amplifier to the output of a thermistor.

* * * * *